United States Patent [19]

McGann

[11] 4,440,361

[45] Apr. 3, 1984

[54] AIRCRAFT STRUCTURE

[76] Inventor: Rodney McGann, 4187 Old San Jose Rd., Santa Cruz, Calif. 95065

[21] Appl. No.: 423,639

[22] Filed: Sep. 27, 1982

Related U.S. Application Data

[63] Continuation-in-part of Ser. No. 208,069, Nov. 18, 1980, abandoned, which is a continuation-in-part of Ser. No. 54,817, Jul. 5, 1979, abandoned.

[51] Int. Cl.³ .............................................. B64C 1/00
[52] U.S. Cl. .................................................... 244/36
[58] Field of Search ....................... 244/12.1, 12.6, 13, 244/15, 23 R, 36, 55, 65, 199, 209

[56] References Cited

U.S. PATENT DOCUMENTS

| 2,316,885 | 4/1943 | Ortega | 244/13 |
| 2,561,291 | 7/1951 | Rethorst | 244/36 |
| 2,913,196 | 11/1959 | Cox | 244/36 |
| 2,989,269 | 6/1961 | Le Bel | 244/36 |
| 3,017,139 | 1/1962 | Binder | 244/12.6 |
| 3,117,746 | 1/1964 | Taylor | 244/15 |
| 4,019,699 | 4/1977 | Wintersdorff | 244/36 |
| 4,033,526 | 7/1977 | Benson | 244/36 |

FOREIGN PATENT DOCUMENTS

| 707463 | 5/1941 | Fed. Rep. of Germany | 244/36 |
| 640717 | 6/1962 | Italy | 244/36 |

Primary Examiner—Charles E. Frankfort
Attorney, Agent, or Firm—Thomas H. Whaley

[57] ABSTRACT

A low aspect ratio airfoil or aircraft wing structure particularly useful in small personal aircraft and STOL aircraft wherein an improved propulsion system substantially eliminates wing tip vortices during take-off and climb operations. An air intake port on the upper surface of the airfoil adjacent the tip end of the foil supplies air for propulsion and increases the lift-to-drag characteristics of the aircraft.

7 Claims, 5 Drawing Figures

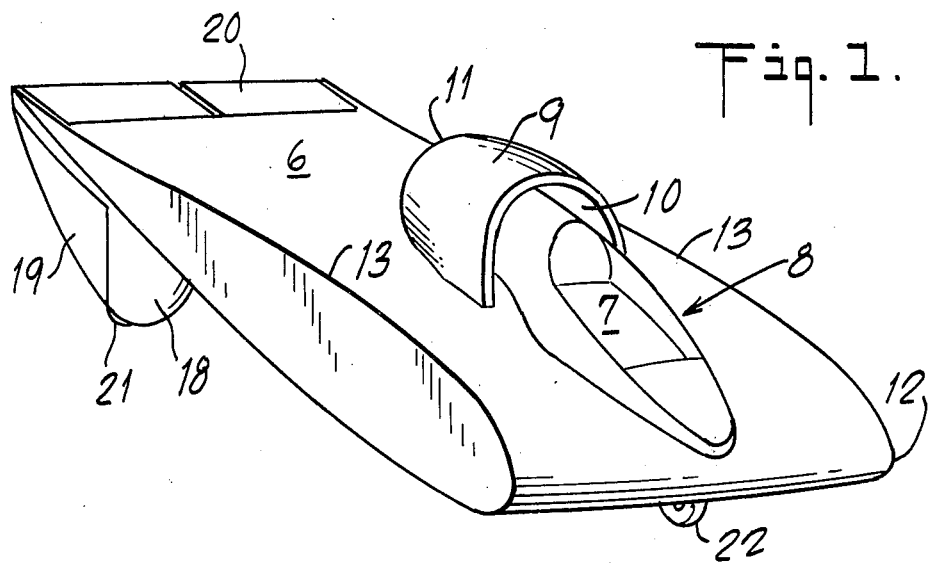
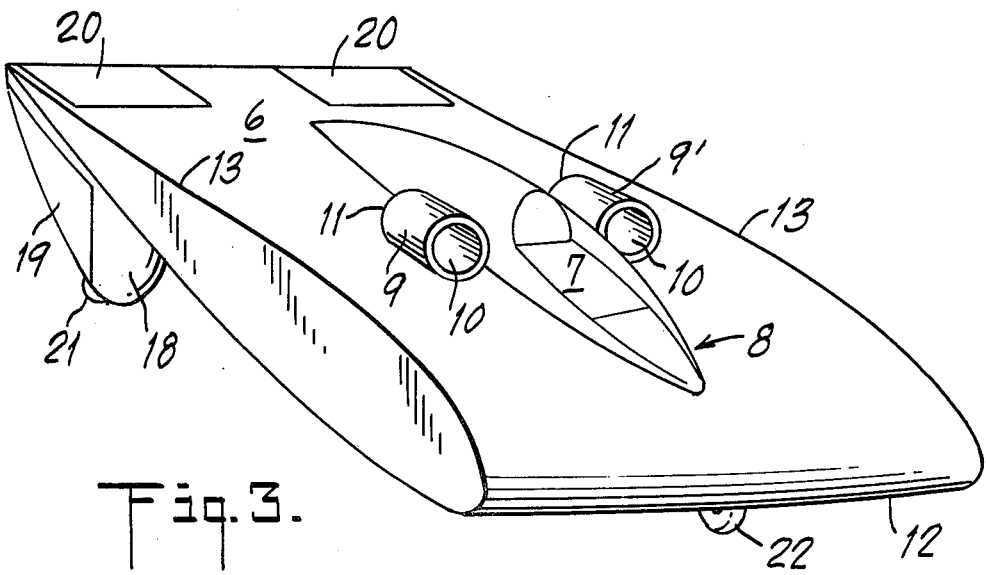

AIRCRAFT STRUCTURE

This application is a continuation-in-part of my copending U.S. patent application Ser. No. 208,069, filed Nov. 18, 1980, now abandoned, which, in turn is a continuation-in-part of my application Ser. No. 054,817, filed July 5, 1979, now abandoned.

This invention relates to an improved airfoil and to an aircraft having a ducted fan propulsion system on its upper surface near the tip of the airfoil.

When a solid object is moved through a fluid, turbulence is created in the fluid, the amount of turbulence depending to a large extent on the shape of the solid. Fluid vortices are usually created which result in resistance to movement of the object; this resistance to movement is often termed "drag". When an aircraft wing, for example, passes through air creating lift, the pressure on the lower surface of the wing is greater than that of its upper surface. Consequently, airflow around the tip of the wing from the high pressure region below the wing to the low pressure region above it sets up vortices at the wing tips and creates drag on the aircraft. The vortex drag effect is particularly pronounced with airfoils having low aspect ratios and is greatest during those periods of operation requiring a high angle of wing to air attack, as during take-off, landing, and initial climb operations. Vortex drag is minimal during normal level flight conditions where speed and fuel economy are important.

Aircraft wing fences are known to be useful for reducing the aerodynamic drag of aircraft wings and are illustrated and described, for example, in U.S. Pat. Nos. 1,724,110 and 4,238,094, and incorporated herein by reference. The fence itself imposes some drag on the aircraft, known as "parasitic drag"; consequently, the drag of the fence must be balanced against its beneficial effect. Under normal or level flight conditions, periods in which the angle of attack of the wing relative to the air is low, a fence may have a negative effect on performance of the aircraft due to its parasitic drag.

The present invention provides an apparatus and method for improving the performance of low aspect ratio rectangular wing aircraft by increasing the lift-to-drag ratio of the aircraft. In a preferred embodiment of this invention, the main body of the aircraft is an airfoil.

The present invention provides an improved rectangular wing type aircraft structure which substantially reduces the induced drag of the wing at high angles of attack, for example, during take-offs and climb periods by eliminating or substantially reducing wing tip vortices and at the same time produces less parasitic drag than aircraft wing tip plates, fins, or fences employed heretofore for the same purpose. Wing tip vortices are avoided in aircraft wing structures of the subject invention by drawing the air spilled over the wing tip away from the wing tip along the upper surface of the wing. This is accomplished in a preferred embodiment of this invention by providing a ducted fan type propulsion system on the upper surface of the aircraft wing with an inlet port having a near-minimum ratio of circumference to area extending above the upper surface of the wing. The inlet port is located near the wing tip and rearward of the leading edge of the wing. Air is drawn into an inlet port of the duct by a fan or other suitable propulsion means, e.g. a fan jet aircraft turbine, at a velocity greater than the airspeed of the aircraft. In a preferred embodiment, a ducted fan is employed to ingest air from the upper surface of the wing and to propel the aircraft.

Throughout this specification the terms "wing" and "airfoil" are used more or less interchangeably to designate a streamlined body structure capable of producing by its motion through air a component or components of force perpendicular to the direction of motion of said body. The body structure may comprise an aircraft wing in the usual or popular sense or an aircraft of the so-called "flying wing" type having no separate fuselage.

Ducted aircraft propulsion systems for aircraft of the all wing or flying wing type are known in the art, for example, U.S. Pat. Nos. 4,019,699 and 4,033,526. A ducted wing aircraft is disclosed in 3,507,463.

The accompanying drawings illustrate preferred embodiments of the present invention.

FIG. 1 is a perspective view of a single duct, single or multiple engine aircraft embodying the principles of this invention.

FIG. 2 is a side elevational view of the aircraft of FIG. 1.

FIG. 3 is a perspective view of a twin duct version of the aircraft illustrating the application of the principles of this invention to single or multiple engine aircraft.

Figure 4:
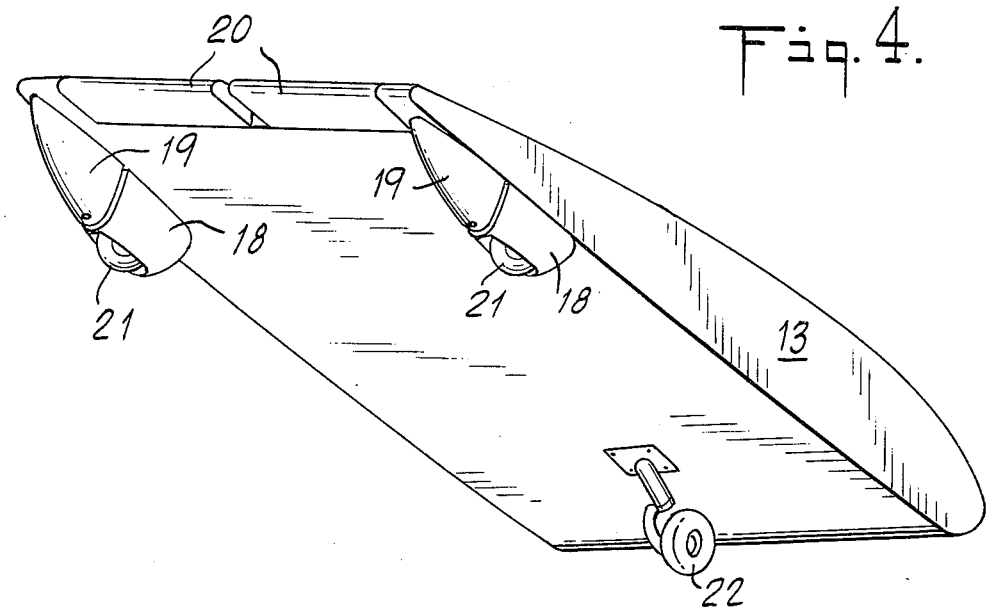
FIG. 4 is a perspective view from below of the aircraft of FIG. 1.
Figure 5:
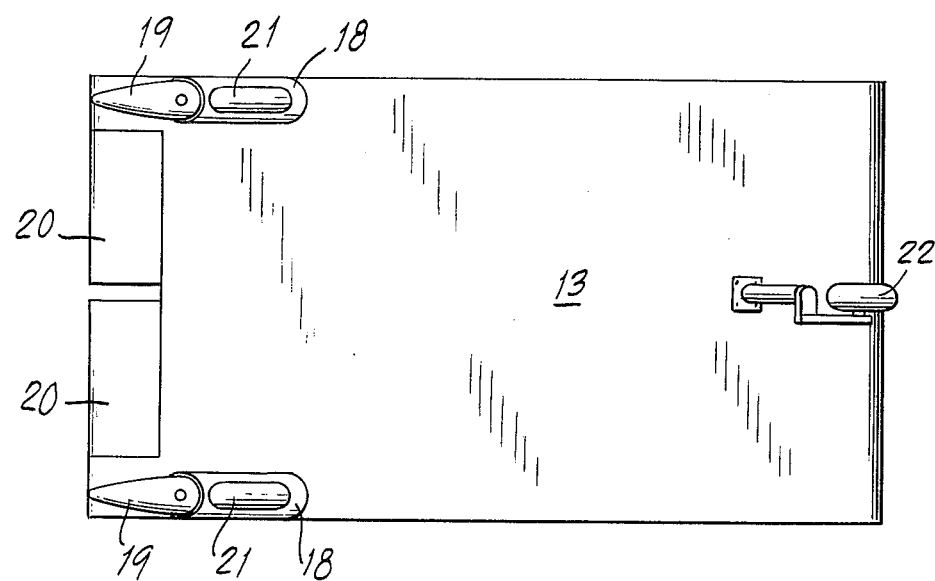
FIG. 5 is a bottom plan view of the aircraft of FIG. 1.

With reference to the drawings, an aircraft embodying the principles of the subject invention is illustrated in FIG. 1 wherein the body 6 of the aircraft is the airfoil. The aircraft is of the type popularly known as a flying wing with a cockpit or passenger compartment 7 at the center of the wing forward of the center of gravity of the aircraft. The passenger compartment is provided with a canopy 8. In this embodiment, a duct 9 is positioned just aft the passenger compartment and comprises an inverted U-shaped inlet port 10 above the upper surface of the wing and a circular outlet port 11. The inlet port 10 is located about 25 to 40 percent of the chord, suitably 35 to 40 percent of the chord, from the leading edge 12 of the airfoil and preferably less than one sixth the chord from the tips 13 of the airfoil. The tips of the airfoil preferably are rectangular, as illustrated, but may be faired to reduce drag, if desired. As illustrated diagrammatically in FIG. 2, an engine 16 and ducted fan 17 provide propulsion of the aircraft. The aircraft is also provided with fins 18 and rudders 19 on the lower surface of the airfoil at each tip of the airfoil and with elevons (combination elevators and ailerons) 20 at the trailing edge of the airfoil for maneuvering the aircraft during flight. A pair of rear wheels 21 and one or more nose wheels 22, suitably of the conventional tricycle landing gear configuration, are provided for landing, taxiing, and ground transportation. As illustrated in the drawings, the fins 18 preferably shroud the rear wheels 21 and the leading edge of the rudder is preferably recessed into the rear of the fin as in FIG. 7 of U.S. Pat. No. 4,019,699.

Another embodiment of the aircraft structure is illustrated in FIG. 3. In this embodiment, the aircraft is provided with two fan ducts 9 and 9' one on each side of the passenger compartment 7, each of which is provided with a fan for propulsion of the aircraft. In this embodiment the inlet ports are circular. As in the embodiment illustrated in FIG. 1, the inlets to the fan ducts 9 and 9' are spaced from the leading edge of the airfoil a distance within the range of about 25 to 40 percent of the chord at a substantial distance from the trailing edge of the airfoil and are located less than one sixth the chord from the tips of the airfoil.

At low air speeds, as during take-off and climb, air is pulled in from the wing tips, especially from those regions near the leading edge of the wing tips along the upper surface of the wing, preventing or substantially reducing drag due to wing tip vortices. At normal cruising speeds, when the speed of the aircraft approaches the velocity of the air drawn into the ducts, the drag effect of wing tip vortices is relatively low due to the low angle of wing to air attack.

If desired, a fence may be used in conjunction with the wing structure described herein. When a fence is used with the structure of this invention, it should be positioned at the wing tip well back from the leading edge of the wing, preferably with the leading edge of the fence spaced about 30 to 40 percent of the wing chord rearward of the leading edge of the wing.

The wing structure of this invention is particularly useful for low aspect ratio rectangular wing aircraft. "Aspect ratio" is defined as the ratio of the square of the span of a wing to its area. For rectangular wings, the aspect ratio is the ratio of the span to the chord. Low aspect ratio aircraft of the type illustrated are particularly well suited to the needs of a private owner and are well adapted to STOL (short take-off and landing) operations. They are useful for shuttle service and other applications requiring high maximum lift coefficients for operation in limited areas of access. These aircraft have high climb and glide angles which, coupled with their short wing spans, permit them to operate in areas normally accessible only to helicopters and ground vehicles.

A rectangular wing aircraft having an aspect ratio in the range of about 0.35 to 1, i.e., a wing span less than or equal to the chord of the wing, represents a preferred embodiment of this invention. A particularly preferred embodiment has an aspect ratio in the range of 0.35 to 0.50. Both single and multiple engine aircraft, utilizing the principal features of this invention, are envisioned. In either case, a vertical substantially circular, oval or inverted U-shaped ducted air intake port is provided adjacent each wing tip. Suitable provision is made in the design of the aircraft for drawing air into the air ducts at a velocity in excess of the air speed during take-off and climb operations. A ducted fan propulsion system is preferred.

In one preferred embodiment of the invention, the inlet port on the upper surface of the airfoil is not more than one third chord length from the tip of the airfoil and one third of the chord length aft the leading edge of the airfoil. The plane of the inlet port is normal to the direction of flight of the aircraft. An engine driven fan within the duct draws air through an inlet port defined by the duct and the upper surface of the airfoil and expels it rearward to provide forward propulsion of the aircraft. A fan jet engine may replace the engine driven fan without departing from the spirit of the invention. It is essential that the air intakes be located on the upper surfaces of the wings relatively near the wing tips and well back from the leading edge of the wing.

As previously mentioned, wing fences may be used in conjunction with the aircraft of this invention, particularly in the case of aircraft intended for use for fire fighting, cropdusting and STOL (short take-off and landing) type aircraft. The fences may be used on either the upper or lower surface of the wing, or on both, usually well back from the leading edge of the airfoil, the particular configuration being chosen for best overall performance for the given aircraft with which they are used.

Flight tests with single engine model aircraft having rectangular wings and a span-to-chord ratio of the order of 0.4 indicate that the airfoil structure of this invention is capable of increasing the lift-to-drag ratio of aircraft in normal or level flight operations by as much as 125 percent or more as compared with theoretical. This beneficial effect of lift-to-drag ratio under normal or level flight conditions is accomplished by placement of the air intake port for the propulsion system on the upper surface of the wing near the wing tip which causes some of the air flow around the tip of the wing to be drawn into the air intake port on the upper surface of the wing.

As a possible explanation of the mechanism of the observed beneficial effects of the novel aircraft structure of this invention in improving flight performance of a rectangular wing low aspect ratio aircraft, and without any intention of limiting the scope of the claims defining this invention, it is believed that the intake of air through the inlet ports on the upper surface of the airfoil inhibits the formation of vortices normally occurring at the wing tips of such aircraft and causes additional flow of air on the upper wing surface, thereby increasing the lift and reducing the drag of the airfoil. In any case, the lift-to-drag ratio of the aircraft is substantially increased.

I claim:

1. An aircraft structure comprising a substantially rectangular airfoil having an aspect ratio within the range of 0.35 to 1 comprising a leading edge, a trailing edge, and substantially rectangular tips free from obstructions to air flow around the tips adjacent the leading edge, a duct mounted on the upper surface of the airfoil having an air inlet port on the upper surface only of said airfoil and spaced not more than one third the chord of said airfoil from said tips and within the range of about 25 to 40 percent of said chord from the leading edge of said airfoil and said duct being spaced a substantial distance from the trailing edge of said airfoil, and means for inducing airflow from said leading edge and from said tips into and through said air inlet port and duct at a velocity greater than the velocity of flow of air over the leading edge of the airfoil thereby substantially eliminating vortices at the tips of the airfoil, and a downwardly extending fin and rudder at each tip of the airfoil on the lower surface thereof near the trailing edge of said airfoil.

2. An aircraft structure as defined in claim 1 wherein a passenger compartment is contained within said airfoil.

3. An aircraft structure as defined in claim 2 wherein said air inlet port has an inverted U-shape.

4. An aircraft structure as defined in claim 3 wherein said duct is aft of said passenger compartment and said airfoil has an aspect ratio in the range of about 0.35 to 0.5.

5. An aircraft structure as defined in claim 3 wherein said means for inducing airflow comprises an engine driven fan contained within said duct providing a ducted fan propulsion system for said aircraft.

6. An aircraft structure as defined in claim 4 wherein said aspect ratio is about 0.4.

7. An aircraft structure as defined in claim 1 wherein a plurality of ducts are mounted on the upper surface of the wing with a duct adjacent each tip of the wing.

* * * * *